US010688873B2

(12) United States Patent
Götz et al.

(10) Patent No.: US 10,688,873 B2
(45) Date of Patent: Jun. 23, 2020

(54) CHARGING SYSTEM FOR ELECTRIC VEHICLES

(71) Applicant: Dr. Ing. h.c. F. Porsche Aktiengesellschaft, Stuttgart (DE)

(72) Inventors: Stefan Götz, Forstern (DE); Manuel Groß, Hessigheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 135 days.

(21) Appl. No.: 16/008,294

(22) Filed: Jun. 14, 2018

(65) Prior Publication Data

US 2018/0370374 A1    Dec. 27, 2018

(30) Foreign Application Priority Data

Jun. 22, 2017    (DE) .......................... 10 2017 113 842

(51) Int. Cl.
*H02J 7/00* (2006.01)
*H02J 7/14* (2006.01)
(Continued)

(52) U.S. Cl.
CPC ........... *B60L 11/1824* (2013.01); *B60L 53/14* (2019.02); *B60L 53/30* (2019.02); *B60L 53/302* (2019.02);
(Continued)

(58) Field of Classification Search
USPC ......................................................... 320/109
See application file for complete search history.

(56) References Cited

U.S. PATENT DOCUMENTS

| 8,400,106 B2 | 3/2013 | Midrouillet et al. |
| 2011/0115425 A1 | 5/2011 | Olsson |

(Continued)

FOREIGN PATENT DOCUMENTS

| WO | 2011145939 A2 | 11/2011 |
| WO | 2014170074 A2 | 10/2014 |

OTHER PUBLICATIONS

Australian Examination Report for Australian Application No. 2018204413, dated May 10, 2019, 4 pages.

*Primary Examiner* — Alexis B Pacheco
(74) *Attorney, Agent, or Firm* — RatnerPrestia

(57) ABSTRACT

Charging system for electric vehicles, having: a charging station to which a traction battery of an electric vehicle can be coupled via a charging cable; power electronics, the charging station being able to be connected, with the interposition of the power electronics, to an electrical current and voltage supply network which provides a defined electrical network power; an electrical storage device which is connected between the electrical current and voltage supply network and the charging station such that said storage device is charged on the basis of the electrical network power and is discharged on the basis of a charging speed of the charging station; a re-cooling apparatus, the charging station, the power electronics and the electrical storage device connected to the re-cooling apparatus which provides a defined as thermal re-cooling power; a thermal storage device connected to the re-cooling apparatus, to the charging station, to the power electronics and to the electrical storage device such that said storage device or a cooling medium of said storage device is heated on the basis of the power loss of the power electronics, charging station and electrical storage device and can be cooled on the basis of the thermal re-cooling power of the re-cooling apparatus.

15 Claims, 3 Drawing Sheets

(51) Int. Cl.
  *B60L 11/18* (2006.01)
  *H01M 10/44* (2006.01)
  *H01M 10/613* (2014.01)
  *H02J 7/04* (2006.01)
  *B60L 53/30* (2019.01)
  *H01M 10/66* (2014.01)
  *B60L 53/62* (2019.01)
  *B60L 53/67* (2019.01)
  *B60L 53/53* (2019.01)
  *B60L 53/14* (2019.01)
  *B60L 53/302* (2019.01)

(52) U.S. Cl.
  CPC .............. *B60L 53/53* (2019.02); *B60L 53/62* (2019.02); *B60L 53/67* (2019.02); *H01M 10/443* (2013.01); *H01M 10/613* (2015.04); *H01M 10/66* (2015.04); *H02J 7/04* (2013.01)

(56) References Cited

U.S. PATENT DOCUMENTS

| | | | |
|---|---|---|---|
| 2011/0204720 A1* | 8/2011 | Ruiz | G06Q 50/06 307/66 |
| 2012/0041855 A1* | 2/2012 | Sterling | B60L 3/0046 705/34 |
| 2012/0056588 A1 | 3/2012 | Cai et al. | |
| 2013/0221918 A1 | 8/2013 | Hill et al. | |
| 2014/0225559 A1 | 8/2014 | Sugano | |
| 2015/0054460 A1 | 2/2015 | Epstein et al. | |
| 2015/0283914 A1* | 10/2015 | Malone | B60H 1/004 701/49 |
| 2015/0306974 A1* | 10/2015 | Mardall | H01M 10/625 320/150 |
| 2015/0357663 A1* | 12/2015 | Ramaswamy | H01M 8/04388 429/429 |
| 2016/0207416 A1* | 7/2016 | Gauthier | B60W 10/00 |
| 2017/0232865 A1* | 8/2017 | Christen | H01M 10/613 429/120 |
| 2017/0318921 A1* | 11/2017 | Gharabegian | A45B 23/00 |
| 2018/0339605 A1* | 11/2018 | Ochocinski | B60L 15/2045 |

\* cited by examiner

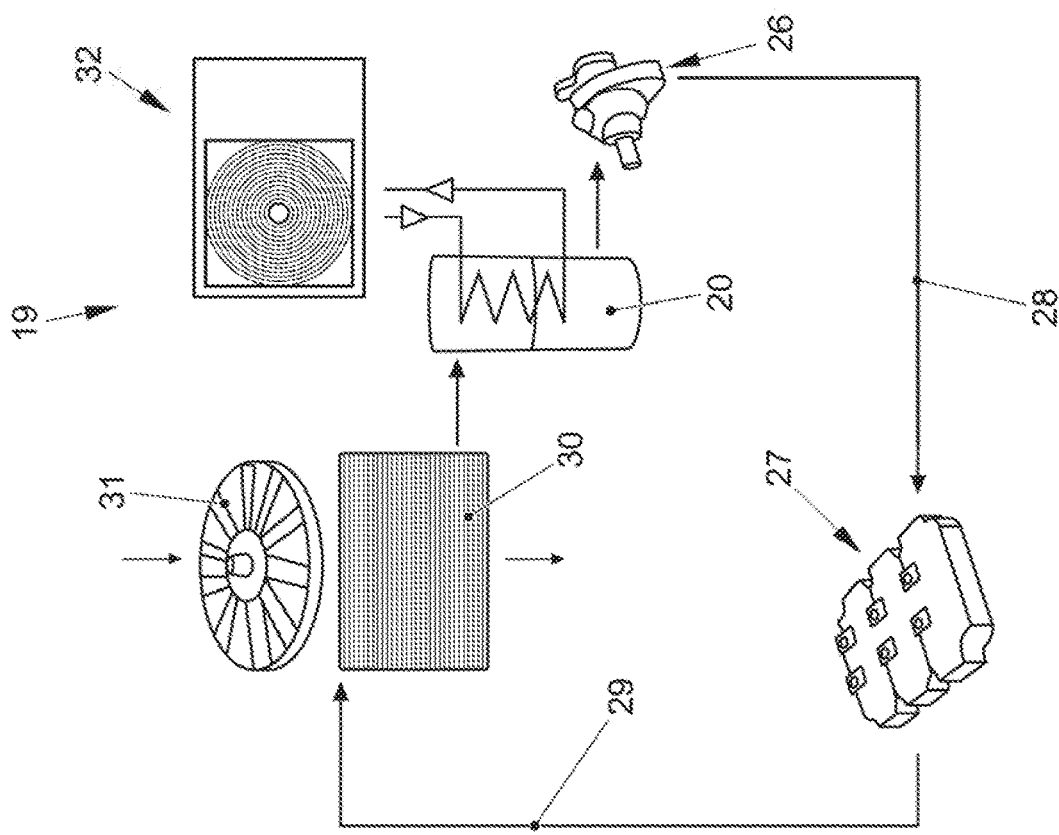
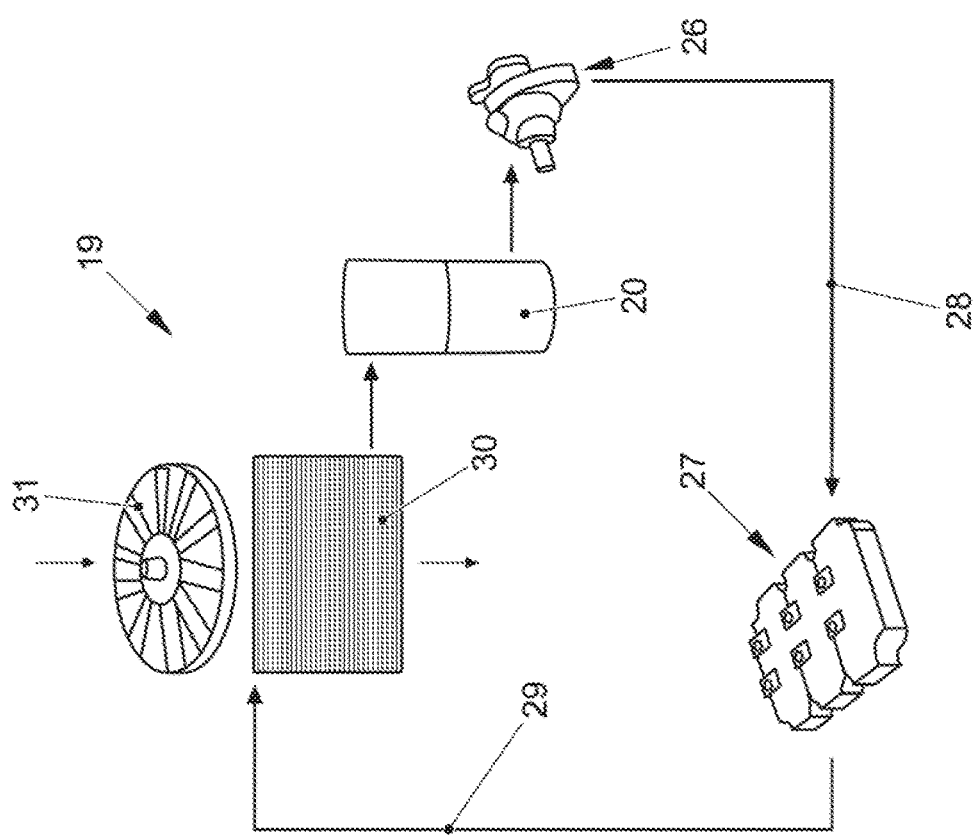

CHARGING SYSTEM FOR ELECTRIC VEHICLES

CROSS-REFERENCE TO RELATED APPLICATION

This application claims priority to German Patent Application No. DE 10 2017 113 842.0, filed Jun. 22, 2017, which is incorporated by reference herein in its entirety.

FIELD OF THE INVENTION

The present invention relates to a charging system for electric vehicles.

BACKGROUND OF THE INVENTION

The so-called AC charging mode and the so-called DC charging mode are known for charging an electric vehicle, specifically for charging a traction battery of an electric vehicle.

In the AC charging mode, the electric vehicle is connected, via its on-board charging device, to an electrical current and voltage supply network which provides AC voltage and alternating current, the on-board charging device carrying out the conversion to direct current. In the so-called AC charging mode, the charging speed for the traction battery is restricted. Charging times in the AC charging mode are several hours for each 100 kilometer range.

The traction battery of an electric vehicle can be charged more quickly via a DC charging mode, in which case the traction battery is not charged via the on-board charging device of the electric vehicle in the DC charging mode, but rather by virtue of the traction battery being directly connected, with the circumvention of the on-board charging device, to a charging station which is outside the vehicle and provides direct current for charging the traction battery. The DC charging mode can be used to achieve higher charging speeds than the AC charging mode, but it has hitherto not yet been possible to provide charging speeds for the traction battery of an electric vehicle in the DC charging mode which are of the order of magnitude of a refueling operation in conventional vehicles driven by internal combustion engines.

Previously known charging systems for electric vehicles which are used for the DC charging of the traction battery of electric vehicles have accordingly not been able to hitherto ensure high charging speeds since, on the one hand, the electrical network power provided by the available electrical current and voltage supply network is not sufficient under certain circumstances to provide a desired charging speed and, on the other hand, taking into account the fact that, at high charging speeds, high losses also occur and result in a high development of heat which has hitherto not been able to be sufficiently dissipated, however.

EP 2 572 431 B1, which is incorporated by reference herein, discloses a charging system for electric vehicles having a plurality of charging stations. The traction battery of an electric vehicle can be charged in the region of each charging station, the traction battery of the respective electric vehicle being able to be coupled to the respective charging station in the region of each charging station via a charging cable. The charging system in EP 2 572 431 B1, which is incorporated by reference herein, also has power electronics having a plurality of power converters in order to convert the network power provided by an electrical current and voltage supply network for the purpose of charging the traction battery of the electric vehicles.

EP 2 986 468 B1, which is incorporated by reference herein, discloses a further charging system for electric vehicles. Said document discloses a charging station to which a traction battery of an electric vehicle can be coupled via a charging cable of the charging station. The traction battery of the electric vehicle can be cooled via a heat sink provided by the charging station, specifically by virtue of the heat sink of the charging station making thermal contact with a contact-making area of the traction battery.

There is therefore a need for a charging system for electric vehicles which, from an electrical point of view on the one hand, and from a thermal point of view on the other hand, allows the electric vehicles to be charged at a high charging speed or with a charging power, in particular of more than 300 kW for each vehicle.

SUMMARY OF THE INVENTION

This object is achieved by a charging system for electric vehicles having at least one charging station to which a traction battery of an electric vehicle can be coupled via a charging cable of the respective charging station, having power electronics, the respective charging station being able to be connected, with the interposition of the power electronics, to an electrical current and voltage supply network which provides a defined electrical network power, wherein at least one electrical storage device which is connected between the electrical current and voltage supply network and the respective charging station in such a manner that said storage device can be charged on the basis of the electrical network power of the electrical current and voltage supply network and can be discharged on the basis of a charging speed of the power electronics and of the respective charging station, a re-cooling apparatus, the respective charging station, the power electronics and the, or each, electrical storage device being connected to the re-cooling apparatus which provides a defined thermal re-cooling power, at least one thermal storage device which is connected to the re-cooling apparatus, to the respective charging station, to the power electronics and to the, or each, electrical storage device in such a manner that said storage device or a cooling medium of said storage device can be heated on the basis of the power loss of the power electronics, of the respective charging station and of the respective electrical storage device and can be cooled on the basis of the thermal re-cooling power of the re-cooling apparatus.

The charging system comprises at least one electrical storage device which is connected between the electrical current and voltage supply network and the respective charging station in such a manner that said storage device can be charged on the basis of the electrical network power of the electrical current and voltage supply network and can be discharged on the basis of a charging speed of the power electronics and of the respective charging station.

The charging system also comprises at least one re-cooling apparatus, the respective charging station, the power electronics and the, or each, electrical storage device being connected to the re-cooling apparatus which provides a defined thermal re-cooling power.

The charging system also comprises at least one thermal storage device which is connected to the re-cooling apparatus, to the respective charging station, to the power electronics and to the, or each, electrical storage device in such a manner that said storage device or a cooling medium of said storage device can be heated on the basis of the power loss of the power electronics, the respective charging station and the respective electrical storage device and can be cooled on the basis of the thermal re-cooling power of the re-cooling apparatus.

The charging system according to aspects of the invention comprises at least one electrical storage device and at least one thermal storage device.

The, or each, electrical storage device can be connected to an electrical current and voltage supply network and can be charged by the latter, to be precise at a charging speed which depends on the electrical network power of the electrical current and voltage supply network. In order to charge a traction battery of a motor vehicle, the electrical energy stored in the electrical storage device can be retrieved in order to charge the traction battery from the electrical energy storage device, preferably in a manner assisted by the electrical current and voltage supply network, at a higher speed than that at which it is possible to charge the electrical energy storage device from the electrical current and voltage supply network.

In particular, an electrical energy storage device makes it possible to provide a charging power of more than 300 kW for each vehicle. High charging speeds can therefore be achieved.

The heat loss arising at such high charging powers for electric vehicles can be dissipated via the, or each, thermal storage device in order to prevent impermissibly great heating of the power electronics or of the respective charging station or of the respective electrical storage device, for example.

The heat received by the thermal storage device is then dissipated via the re-cooling apparatus which provides a re-cooling power in order to cool the thermal storage device or the cooling medium used by the thermal storage device.

According to one advantageous development, the, or each, electrical storage device and the, or each, thermal storage device are matched to one another with respect to their respective dynamics. The practice of matching the electrical storage device and the thermal storage device with respect to their dynamics is particularly preferred for providing an efficient charging system for electric vehicles. It is possible to charge a plurality of electric vehicles at a sufficient charging speed.

The thermal re-cooling power of the, or each, thermal storage device is preferably adapted to the electrical network power of the current and voltage supply network in such a manner that the electrical storage device is charged and the thermal storage device is re-cooled after a charging operation of a traction battery of an electric vehicle within a defined period. This makes it possible to provide an efficient charging system for electric vehicles in a particularly advantageous manner. It is possible to charge a plurality of electric vehicles at a sufficient charging speed.

The, or each, electrical storage device and the, or each, thermal storage device, are preferably matched to one another with regard to their respective capacity.

For this purpose, an electrical capacity of the, or each, electrical storage device and a thermal capacity of the, or each, thermal storage device are preferably matched to one another in such a manner that the electrical storage device provides the necessary charging energy and the thermal storage device provides the necessary cooling energy for a defined number of charging operations of traction batteries.

The practice of matching the capacities of the electrical storage device and of the thermal storage device is particularly advantageous for providing an efficient charging system. It is possible to charge a plurality of electric vehicles at a sufficient charging speed.

The electrical capacity of the, or each, electrical storage device of the charging system is also preferably designed with maximization of a service life of the electrical storage device and/or taking into account a network stability of the electrical current and voltage supply network. The efficiency of the charging system can be increased further taking these boundary conditions into account.

The thermal capacity of the, or each, thermal storage device is also preferably designed on the basis of ambient temperature influences of the charging system. The efficiency of the charging system can also be increased further taking this boundary condition into account since it is possible to minimize the re-cooling power of the re-cooling apparatus which needs to be kept available.

The electrical capacity of the, or each, electrical storage device of the charging system and the thermal capacity of the, or each, thermal storage device of the charging system and the thermal re-cooling power of the re-cooling apparatus of the charging system are preferably designed for an empirically or statistically determined number of charging operations per unit time and for an empirically or statistically determined charging energy for each charging operation. This makes it possible to deliberately design a charging system for a location-specific requirement. This makes it possible to provide an efficient and economical charging system.

According to one advantageous development, the, or each, electrical storage device of the charging system and the, or each, thermal storage device of the charging system are matched to one another in such a manner that a thermal energy content of the thermal storage device, which corresponds to a product of a thermal capacity and a maximum permissible temperature swing, suffices for the same number of charging operations as can be managed by the electrical storage device on the basis of its electrical energy content. These details are used to provide an efficient charging system at which a multiplicity of electric vehicles can be charged at a high charging speed.

According to one advantageous development, the power electronics and the, or each, electrical energy storage device and the charging cable of the, or each, charging station can be cooled with the aid of the re-cooling apparatus. The cooling of the charging cables of the charging stations is important, in particular, in order to effectively dissipate the heat loss arising in the case of high charging powers or charging speeds and to exclude overheating of the charging cables.

BRIEF DESCRIPTION OF THE DRAWINGS

Preferred developments of the invention emerge from the subclaims and the following description. Exemplary embodiments of the invention are explained in more detail on the basis of the drawing without being restricted thereto. In the drawing:

FIG. 3 shows a detail of the charging system from FIG. 1; and

FIG. 4 shows an alternative detail of the charging system from FIG. 1.

Aspects of the invention relates to a charging system for electric vehicles. Such a charging system is also referred to as a charging park.

DETAILED DESCRIPTION OF THE INVENTION

Figure 1:
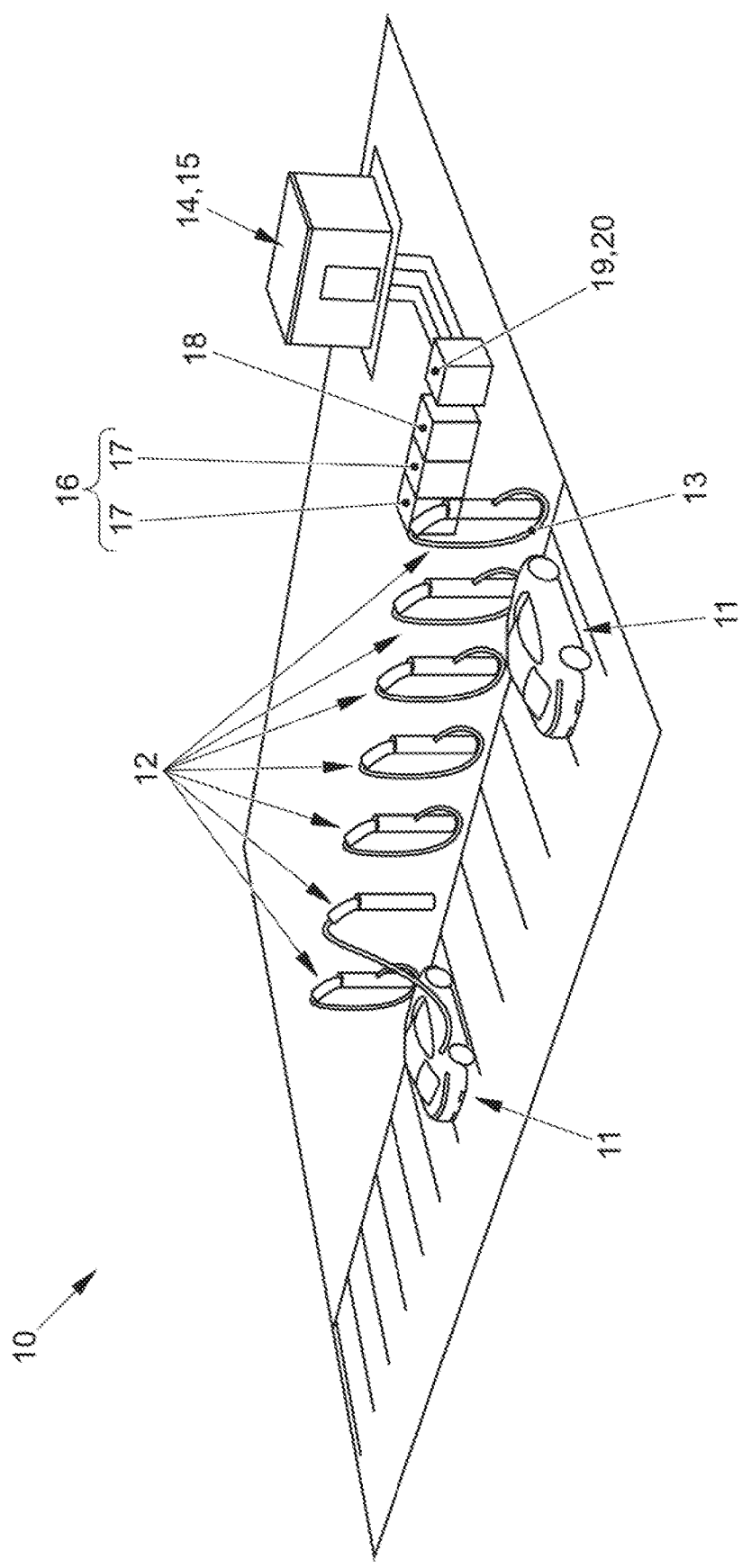
FIG. 1 shows a schematic illustration of a charging system according to aspects of the invention for electric vehicles.

FIG. 1 shows, in a highly schematic manner, the basic structure of a charging system 10 according to aspects of the invention for electric vehicles 11. The charging system 10 has a plurality of charging stations 12 for electric vehicles, an electric vehicle 11 being able to be respectively charged in the region of each of these charging stations 12, which are also referred to as charging poles, specifically by coupling the traction battery of the electric vehicle 11 to the charging station 12 via a charging cable 13 of the respective charging station 12.

FIG. 1 shows two electric vehicles 11 which are connected to the respective charging station 12 via a charging cable 13.

The charging system 10 can be supplied with electrical voltage or electrical current from an electrical current and voltage supply network 14, a transformer 15 of which is shown. In this case, the electrical current and voltage supply network 14 is characterized by a defined electrical network power which is predefined as a boundary condition on the basis of the location.

In the case of previously known charging systems, the charging speed or charging power for the electric vehicles 11 depends, in a limiting manner, on the electrical network power of the electrical current and voltage supply network 14.

The charging system 10 for electric vehicles also has power electronics 16 which, in the exemplary embodiment shown in FIG. 1, are provided by two power electronic modules 17 which hold a power converter for each charging station 12.

Each charging station 12 of the charging system 10 can be connected or is coupled to the electrical current and voltage supply network 14 with the interposition of the power electronics 16 or the power converter provided by the power electronics 16.

The charging system 10 for electric vehicles has at least one electrical storage device 18.

The respective electrical storage device 18 of the charging system 10 is connected between the electrical current and voltage supply network 14 and the respective charging station 12 of the charging system 10 and therefore the power electronics 16 of the charging system 10 in such a manner that the respective electrical energy storage device 18 can be charged on the basis of the electrical network power of the electrical current and voltage supply network 14 and can be discharged on the basis of a charging speed of the power electronics 16 or of the respective charging station 12 when charging the traction battery of an electric vehicle.

In this case, the charging speed at which the electrical energy storage device 18 can be charged from the electrical current and voltage supply network 14 is limited by the electrical network power and is lower than the charging speed of the respective charging station 12 for charging the traction battery of an electric vehicle in order to therefore make it possible for electric vehicles 11, specifically traction batteries of the latter, to be charged at a high charging speed and with a high charging power than would be possible solely via the current and voltage supply network 14, in which case the charging power for each vehicle is preferably more than 300 kW.

The charging system 10 also has a re-cooling apparatus 19 and at least one thermal storage device 20.

The re-cooling apparatus 19 provides a defined thermal re-cooling power for cooling the respective charging station 12 and the power electronics 16 and the electrical storage device 18.

In order to avoid limiting the heat which can be dissipated in the region of the charging stations 12, of the power electronics 16 and of the electrical energy storage device 18 by the thermal re-cooling power of the re-cooling apparatus 19, the charging system 10 also comprises at least one thermal storage device 20.

In this case, the thermal storage device 20 is coupled to the re-cooling apparatus 19, to the respective charging station 12, to the power electronics 16 and to the respective electrical energy storage device 18, with the result that the thermal storage device 20 or a cooling medium of the latter can be heated on the basis of the power loss of the power electronics 16, the power loss of the charging stations 12 and the power loss of the electrical energy storage device 18 and can be cooled on the basis of the thermal re-cooling power of the re-cooling apparatus 19.

In the exemplary embodiment shown, a common electrical storage device 18 and a common thermal storage device 20 are present for all charging stations 12. It is also possible to provide a plurality of electrical storage devices 18 and a plurality of thermal storage devices 20, for example one common electrical storage device and one common thermal storage device 20 for a group of charging stations 12 in each case.

The, or each, electrical storage device 18 therefore allows a network power of the electrical current and voltage supply network 14 which is possibly temporarily too low to be compensated for. In this case, the electrical storage device 18 is charged relatively slowly from the electrical current and voltage network 14 and is discharged quickly as soon as an electric vehicle, specifically the traction battery of an electric vehicle, is being charged at a charging station 12. The electrical current and voltage network 14 preferably supports the electrical storage device 18 when charging a traction battery of an electric vehicle.

It is possible to reduce a re-cooling power to be kept available by the re-cooling system 19 with the aid of the thermal storage device 20 in order to thus design the re-cooling system 19 with smaller dimensions and to reduce relevant costs.

According to one advantageous development, the, or each, electrical storage device 18 and the, or each, thermal storage device 20 are matched to one another with respect to their respective dynamics and/or with respect to their respective capacity. Both the dynamics and the capacities and therefore storage capacities of the, or each, electrical storage device 18 and of the, or each, thermal storage device 20 are preferably matched to one another. It is thus possible, in particular, to match the thermal cooling power to be kept available to the electrical charging power kept available. The, or each, electrical storage device 18 provides electrical energy for charging operations of traction batteries of electric vehicles 11, possibly with the support of the electrical current and voltage network. The, or each, thermal storage device 20 is used to receive and dissipate heat loss arising during charging operations, with the assistance of the re-cooling system 19.

Provision is preferably made for the thermal re-cooling power, which is made available to the re-cooling apparatus 19 for the, or each, thermal storage device 20, to be adapted to the electrical network power of the electrical current and voltage supply network, which is used to charge the, or each, electrical storage device 18, in such a manner that the electrical energy storage device 18 is charged, on the one hand, and the thermal storage device 20 is re-cooled, on the other hand, after a charging operation of a traction battery of an electric vehicle 11 within a defined period. This is preferred for the purpose of matching the charging dynamics and the cooling dynamics of the charging system.

In this case, provision is made, in particular, for the electrical storage device 18 to be charged, on the one hand, and for the thermal storage device 20 to be re-cooled, on the other hand, after the charging operation of a traction battery of an electric vehicle 11 at the same speed. This is particularly preferred for the purpose of matching the charging dynamics and the cooling dynamics of the charging system.

The capacities of the storage devices 18, 19 are also matched to one another, specifically the electrical capacity of the, or each, electrical storage device 18 and the thermal capacity of, or each, thermal storage device 20.

The electrical capacity of the, or each, electrical storage device 18 and the thermal capacity of the, or each, thermal storage device 20 are preferably matched to one another in such a manner that the, or each, electrical storage device 18 provides the necessary charging energy and the, or each, thermal storage device 20 provides the necessary cooling energy for a defined number of charging operations of traction batteries of electric vehicles 11.

Provision is particularly preferably made for the electrical capacity of the, or each, electrical storage device 18 and the thermal capacity of the, or each, thermal storage device 20 and the thermal re-cooling power of the re-cooling apparatus 19 to be designed for an empirically or statistically determined number of charging operations per unit time and for an empirically or statistically determined charging energy for each charging operation in order to optimally design the degrees of freedom of the charging system in a manner matched to the location of the charging system and location-specific boundary conditions, specifically the size or capacity of the, or each, electrical storage device 18, the size or capacity of the, or each, thermal storage device 20 and the re-cooling power of the re-cooling apparatus 19.

The electrical network power of the electrical current and voltage supply network 14 is predefined and should be heeded as a boundary condition. The statistically or empirically determined number of charging operations per unit time, that is to say an empirically or statistically determined charging frequency, a statistically or empirically determined required charging energy for each charging operation, the number of charging points of the charging system and the desired or predefined charging power for each charging operation and an acceptable predefined waiting time between charging operations, are also used as boundary conditions to be heeded during design, as stated above.

Figure 2:
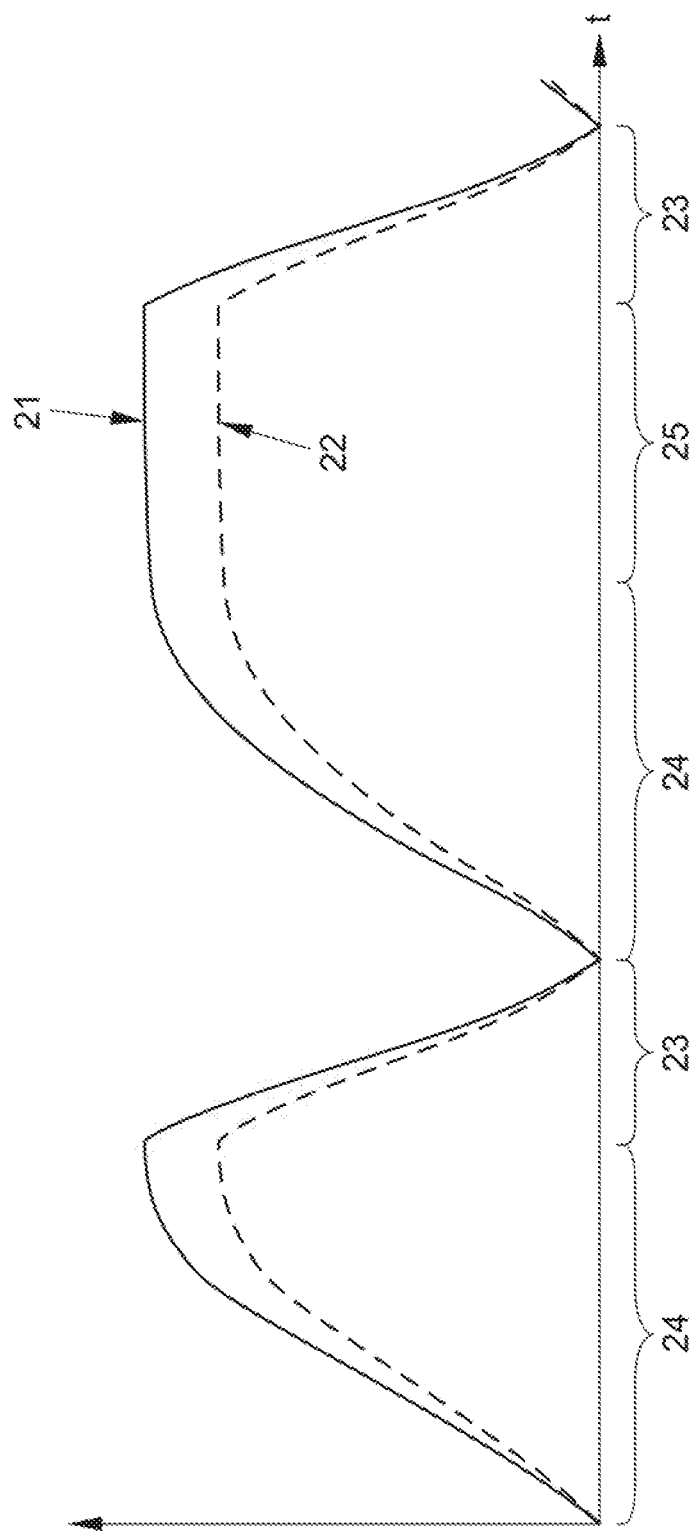
FIG. 2 shows a graph for illustrating design details of the charging system from FIG. 1.

FIG. 2 visualizes, in a highly schematic manner, the mutually matched design of the degrees of freedom of the charging system over time t, specifically the design of the capacities of the storage devices 18, 19 and of the re-cooling power of the re-cooling apparatus. The curve profile 21 in FIG. 2 thus visualizes an electrical state of charge of an electrical storage device 18 and the curve profile 22 visualizes a thermal receiving capability of the thermal storage device 20.

The phases 23 in FIG. 2 visualize the profile of the state of charge 21 and of the thermal receiving capability 22 during a charging operation of a traction battery. The as phases 24 in FIG. 2 visualize the state of charge 21 and the thermal receiving capability 22 during recovery of the storage devices 18, 20 after the conclusion of a charging operation of a traction battery. The phase 25 in FIG. 2 visualizes the state of charge 21 of the electrical storage device 18 and the thermal receiving capability 22 of the thermal storage device 20 for a situation in which neither a charging operation is carried out nor recovery of storage devices 18, 20 is required, that is to say in which the electrical storage device 18 has been fully charged again and the full thermal receiving capability of the thermal storage device 20 is available.

The electrical power of the charging system is adapted, on temporal average, at least to power invoked when charging traction batteries of electric vehicles. The re-cooling power of the re-cooling apparatus 19 is designed in such a manner that, on temporal average, the heat loss arising when charging traction batteries of electric vehicles is dissipated. The storage devices 18 and 20 allow the period of time over which averaging is carried out to be extended.

When designing the capacity of the electrical storage device 18, maximization of the service life of the electrical storage device 18 is preferably taken into account, specifically by keeping a charging stroke and discharging stroke of the electrical storage device 18 within defined limits. A network stability of the electrical current and voltage supply network 14 is also preferably taken into account when designing the electrical storage device 18.

If there is a high probability of the electrical current and voltage supply network 14 failing owing to the location, the electrical capacity of the electrical storage device 18 is designed for this. Furthermore, when determining the capacity of the electrical storage device 18, it is not only possible to take into account the stability of the current and voltage supply network 14 but also energy which can be provided by the current and voltage supply network 14 as a result of other boundary conditions and may depend on the time of day, the season, the day of the week, changing energy costs and the like. Relevant data may be empirically determined and may be taken into account during design via a Poisson or log normal distribution.

When determining the thermal capacity of the thermal storage device 20, environmental conditions of the charging system may be taken into account, for example ambient temperatures prevailing in situ in the region of the charging system.

FIG. 3 shows a detail of the charging system 10 in the region of a thermal storage device 20 which interacts with a re-cooling apparatus 19. FIG. 3 shows the thermal storage device 20 in which a coolant is kept available, the coolant being removed from the storage device 20 via a pump 26 for the purpose of cooling an assembly 27 to be cooled via a feed line 28 in order to be passed in the direction of the assembly 27 to be cooled, and the coolant being returned in the direction of the thermal storage device 20 via a return line 29 after cooling the assembly 27 and being passed beforehand via the re-cooling apparatus 19 which is installed in the return line 29 and, in the exemplary embodiment in FIG. 3, comprises a heat exchanger 30 which interacts with a fan 31.

In FIG. 3, the fan 31 is used to define the amount of air which is passed via the heat exchanger 30 for cooling in order to cool the heated coolant which is passed via the return line 29 before being supplied to the thermal storage device 20. The assembly 27 may be an assembly of the power electronics 16, of the electrical storage device 18 or of a charging pole 12. As already stated, all assemblies at which heat loss arises are cooled, that is to say both assemblies of the power electronics 16, assemblies of the electrical storage device 18 and assemblies of the charging stations 12, in particular the charging cables 13 of the latter.

FIG. 4 shows a further development of the detail from FIG. 3, in which, in addition to the heat exchanger 30 and the fan 31, an air-conditioning compressor 32 is present as a further assembly of a re-cooling apparatus 19. In contrast to FIG. 3, the coolant can then be cooled below the ambient temperature via such an air-conditioning compressor 32. Under certain circumstances, it is possible to dispense with the heat exchanger 30 and the fan 31 when using an air-conditioning compressor 32. When the re-cooling apparatus 19 uses both the heat exchanger 30 and the air-conditioning compressor 32 and the temperature of the coolant in the return 29 is below the ambient temperature, the fan 31 can then be switched off. If, in contrast, the return temperature of the coolant in the return 29 is above the ambient temperature, the fan 31 can be switched on in order to already cool the coolant in the region of the heat exchanger 30 and to then ensure further cooling below the ambient temperature via the air-conditioning compressor 32.

What is claimed is:

1. A charging system for electric vehicles, the system comprising:
    at least one charging station to which a traction battery of an electric vehicle can be coupled via a charging cable of the respective charging station,
    power electronics, the respective charging station configured to be connected, with the interposition of the power electronics, to an electrical current and voltage supply network which provides a defined electrical network power,
    at least one electrical storage device connected between the electrical current and voltage supply network and the respective charging station such that said at least one electrical storage device is charged on the basis of the electrical network power of the electrical current and voltage supply network and discharged on the basis of a charging speed of the power electronics and of the respective charging station,
    a re-cooling apparatus, the respective charging station, the power electronics and each of the at least one electrical storage device being connected to the re-cooling apparatus which provides a defined thermal re-cooling power, and
    at least one thermal storage device connected to the re-cooling apparatus, to the respective charging station, to the power electronics and to the at least one electrical storage device such that said at least one thermal storage device or a cooling medium of said at least one thermal storage device is heated on the basis of the power loss of the power electronics, of the respective charging station and of the respective electrical storage device and cooled on the basis of the thermal re-cooling power of the re-cooling apparatus.

2. The charging system as claimed in claim 1, wherein the at least one electrical storage device and the at least one thermal storage device are matched to one another with respect to their respective dynamics.

3. The charging system as claimed in claim 1, wherein the thermal re-cooling power of the re-cooling apparatus for each of the at least one thermal storage device is adapted to the electrical network power of the electrical current and voltage supply network in such a manner that the electrical storage device is charged and the thermal storage device is re-cooled after a charging operation of a traction battery of an electric vehicle within a defined period.

4. The charging system as claimed in claim 3, wherein the electrical storage device is charged and the thermal storage device is re-cooled after a charging operation of a traction battery of an electric vehicle at the same speed.

5. The charging system as claimed in claim 1, wherein the electrical storage device and the thermal storage device are matched to one another with regard to their respective capacity.

6. The charging system as claimed in claim 1, wherein an electrical capacity of the electrical storage device and a thermal capacity of the thermal storage device are matched to one another in such a manner that the electrical storage device provides the necessary charging energy and the thermal storage device provides the necessary cooling energy for a defined number of charging operations of traction batteries.

7. The charging system as claimed in claim 5, wherein the electrical capacity of the electrical storage device is configured to maximize a service life of the electrical storage device.

8. The charging system as claimed in claim 5, wherein the electrical capacity of the electrical storage device is also designed taking into account a network stability of the electrical current and voltage supply network.

9. The charging system as claimed in claim 5, wherein the thermal capacity of the thermal storage device is configured on the basis of ambient temperature influences of the charging system.

10. The charging system as claimed in claim 1, wherein the electrical capacity of the electrical storage device and the thermal capacity of the thermal storage device and the thermal re-cooling power of the re-cooling apparatus are configured to perform an empirically or statistically determined number of charging operations per unit time and at an empirically or statistically determined charging energy for each charging operation.

11. A charging system for electric vehicles, the system comprising:
    at least one charging station to which a traction battery of an electric vehicle can be coupled via a charging cable of the respective charging station,
    power electronics, the respective charging station configured to be connected, with the interposition of the power electronics, to an electrical current and voltage supply network which provides a defined electrical network power,
    at least one electrical storage device connected between the electrical current and voltage supply network and the respective charging station such that said at least one electrical storage device is charged on the basis of the electrical network power of the electrical current and voltage supply network and discharged on the basis of a charging speed of the power electronics and of the respective charging station,
    a re-cooling apparatus, the respective charging station, the power electronics and each of the at least one electrical storage device being connected to the re-cooling apparatus which provides a defined thermal re-cooling power, and
    at least one thermal storage device connected to the re-cooling apparatus, to the respective charging station, to the power electronics and to the at least one electrical storage device such that said at least one thermal storage device or a cooling medium of said at least one thermal storage device is heated on the basis of the power loss of the power electronics, of the respective charging station and of the respective electrical storage device and cooled on the basis of the thermal re-cooling power of the re-cooling apparatus, wherein the electrical storage device and the thermal storage device are matched to one another in such a manner that a thermal energy content of the thermal storage device, which corresponds to a product of a thermal capacity and a maximum permissible temperature swing, suffices for the same number of charging operations as can be managed by the electrical storage device on the basis of its electrical energy content.

12. The charging system as claimed in claim 1, wherein a coolant, which is available by the thermal storage device for re-cooling, can be re-cooled via a heat exchanger integrated in a return line leading to the thermal storage device and which is preferably assigned a fan.

13. The charging system as claimed in claim 1, further comprising:
a fan associated with the thermal storage device.

14. The charging system as claimed in claim 1, wherein a coolant, which is available by the thermal storage device for re-cooling, is re-cooled via an air-conditioning compressor.

15. The charging system as claimed in claim 1, wherein the power electronics and the electrical energy storage device and the charging cable of the charging station are cooled by the re-cooling apparatus and the thermal storage device.

* * * * *